United States Patent
Palumbo et al.

(10) Patent No.: US 11,661,518 B2
(45) Date of Patent: May 30, 2023

(54) ANISOTROPIC ICEPHOBIC COATING

(71) Applicant: INTEGRAN TECHNOLOGIES INC., Mississauga (CA)

(72) Inventors: Gino Palumbo, Toronto (CA); Herath Katugaha, Toronto (CA); Jonathan McCrea, Oakville (CA); Klaus Tomantschger, Mississauga (CA); Konstantinos Panagiotopoulos, Etobicoke (CA)

(73) Assignee: Integran Technologies Inc., Mississauga (CA)

( * ) Notice: Subject to any disclaimer, the term of this patent is extended or adjusted under 35 U.S.C. 154(b) by 0 days.

(21) Appl. No.: 17/695,970

(22) Filed: Mar. 16, 2022

(65) Prior Publication Data

US 2022/0204778 A1    Jun. 30, 2022

Related U.S. Application Data

(63) Continuation of application No. 16/515,093, filed on Jul. 18, 2019, now Pat. No. 11,319,450.

(51) Int. Cl.
| | |
|---|---|
| *C09D 5/00* | (2006.01) |
| *C09D 175/04* | (2006.01) |
| *C09D 163/00* | (2006.01) |
| *B32B 15/08* | (2006.01) |

(52) U.S. Cl.
CPC ............ *C09D 5/002* (2013.01); *C09D 163/00* (2013.01); *C09D 175/04* (2013.01); *B32B 15/08* (2013.01); *Y10T 428/1355* (2015.01)

(58) Field of Classification Search
CPC ........ C09D 5/002; C09D 163/00; B32B 15/08
See application file for complete search history.

(56) References Cited

U.S. PATENT DOCUMENTS

| | | | |
|---|---|---|---|
| 5,647,919 A | 7/1997 | Kita et al. | |
| 5,681,575 A | 10/1997 | Burrell et al. | |
| 5,753,251 A | 5/1998 | Burrell et al. | |
| 5,837,275 A | 11/1998 | Burrell et al. | |
| 6,238,686 B1 | 5/2001 | Burrell et al. | |
| 6,365,220 B1 | 4/2002 | Burrell et al. | |
| 7,202,321 B2 | 4/2007 | Byrd et al. | |
| 7,320,832 B2 | 1/2008 | Palumbo et al. | |
| 7,553,553 B2 | 6/2009 | Palumbo et al. | |
| 7,934,888 B2 | 5/2011 | Masters et al. | |
| 8,486,319 B2 | 7/2013 | Victor et al. | |
| 8,691,397 B2 | 4/2014 | Facchini et al. | |
| 8,906,515 B2 | 12/2014 | Tomantschger et al. | |
| 10,034,478 B2 | 7/2018 | Krasnow et al. | |
| 11,312,869 B2 * | 4/2022 | Palumbo .................. | C09D 7/70 |
| 11,319,450 B2 * | 5/2022 | Palumbo .............. | C09D 163/00 |
| 2006/0281861 A1 | 12/2006 | Putnam | |
| 2007/0254170 A1 | 11/2007 | Hoover et al. | |
| 2010/0034900 A1 | 2/2010 | Temchenko et al. | |
| 2010/0136325 A1 | 6/2010 | Reddy et al. | |
| 2011/0143148 A1 | 6/2011 | Butts et al. | |
| 2011/0206817 A1 | 8/2011 | Arnold et al. | |
| 2012/0045954 A1 | 2/2012 | Bleecher et al. | |
| 2013/0017401 A1 | 1/2013 | Rehage et al. | |
| 2014/0004352 A1 | 1/2014 | McCrea et al. | |
| 2014/0162022 A1 | 6/2014 | Nowak et al. | |
| 2017/0321077 A1 | 11/2017 | Ranganathan et al. | |
| 2018/0312698 A1 | 11/2018 | Elsbernd et al. | |

FOREIGN PATENT DOCUMENTS

| | | |
|---|---|---|
| WO | WO2015094917 | 6/2015 |
| WO | WO2016090468 | 6/2016 |
| WO | WO2016176350 | 11/2016 |
| WO | WO2018112603 | 6/2018 |

OTHER PUBLICATIONS

Laguna-Camacho et. al.; "Solid Particle Erosion on Different Metallic Materials"; Intech Open Science; Chapter 5; 2013.
Mechanical Rubber, "Durometer Conversion Table", https://www.mechanicaqlrubber.com/elastomericsolutions/wp-content/uploads/2013/08/Durometer-Conversion-Table.pdf (Year: 2021).
Notice of Allowance of U.S. Appl. No. 17/695,988 dated Jan. 25, 2023, 10 pages.

* cited by examiner

*Primary Examiner* — Callie E Shosho
*Assistant Examiner* — Bethany M Miller
(74) *Attorney, Agent, or Firm* — Rankin, Hill & Clark LLP

(57) ABSTRACT

Articles including durable and icephobic polymeric coatings are disclosed. The polymeric coatings include a bonding layer which may contain a substantially fully cured polymeric resin providing excellent adhesion to metallic or polymer substrates. The polymeric coating further includes an outer surface layer which is smooth, hydrophobic and icephobic and, in addition to a substantially fully cured resin, contains silicone comprising additives near the exposed outer surface. The anisotropic polymeric coatings are particularly suited for strong and lightweight parts required in aerospace, automotive and sporting goods applications. A process for making the articles is disclosed as well.

26 Claims, 2 Drawing Sheets

ANISOTROPIC ICEPHOBIC COATING

CROSS REFERENCE TO RELATED APPLICATIONS

The present invention is a continuation of U.S. application Ser. No. 16/515,093 filed Jul. 18, 2019, now U.S. Pat. No. 11,319,450, the disclosure of which is incorporated herein in its entirety.

FIELD OF THE INVENTION

The invention relates generally to an article of manufacture comprising a durable exposed surface which is hydrophobic and has low ice adhesion. The icephobic coating is applied to at least part of an outer surface of the article. The inventive coating comprises a layered or graded structure containing (i) a bonding layer in intimate contact with a metallic, polymeric or composite substrate and (ii) an outer, exposed icephobic layer containing a silicone additive. The anisotropic and durable hydrophobic and icephobic coating may contain distinct sublayers and/or a gradual transition from one chemical composition to another. The invention further relates to a process for fabricating the article.

BACKGROUND OF THE INVENTION

Self-cleaning, superhydrophobic and icephobic coatings are of great interest for use in transportation, consumer, sporting goods and other commercial applications where an article is exposed to environmental elements. Ice accumulation on power lines as well as a variety of vehicles, such as surface or marine vehicles as well as airplanes, can poses significant challenges. The buildup of ice on aerospace components such as wings, propellers and jet engine parts is a significant safety concern and a variety of approaches have been attempted to provide means of preventing ice accumulation.

Various patent filings address the modification of outer surfaces of articles to increase water repellency:

Victor et. al. in U.S. Pat. No. 8,486,319 (2013), assigned to the same assignee as the present application, disclose super-hydrophobic and self-cleaning articles with a polymeric outer roughened/textured surface created by imprinting exposed surfaces with suitable fine-grained and/or amorphous metallic embossing dies to transfer a dual surface structure, including ultra-fine features less than or equal to 100 nm embedded in and overlaying a surface topography with macro-surface structures greater than or equal to 1 μm.

Similarly, various patent filings address coatings applied to outer exposed surfaces of articles, e.g., to render them icephobic:

Putnam et. al. in US 2006/0281861 disclose liquid and/or solid anti-icing fillers and/or oils which are combined with erosion resistant silicone and/or fluorocarbon elastomeric materials to form erosion-resistant and icephobic coatings. These coatings may be utilized to prevent ice build-up on various gas turbine engine components, aircraft components, watercrafts, power lines, and telecommunication lines. Putnam provides no information on adhesion strength between the icephobic coating and the underlying substrate.

Hoover et. al. in U.S. Patent Publication 2007/0254170 disclose a process for protecting an article such as a gas turbine engine fan blade using an anti-icing coating comprising at least one "polysiloxane free of additives" and curing the anti-icing composition to form an anti-icing coating exhibiting an ice shear strength of about 19 kPA to about 50 kPa. The anti-icing coating composition described was identified as the commercially available NuSil™ R-2180 product from NuSil Technology, LLC, Santa Barbara, Calif., USA which is a two-part silicone elastomer dispersed in xylene. Hoover provides no information on adhesion strength between the icephobic coating and the underlying substrate.

Byrd et. al. in U.S. Pat. No. 7,202,321 (2007) disclose a method for applying a polysiloxane-containing coating to a substrate, said coating preferably comprising a polysiloxane (amide-ureide). The coating is durable, long lasting, corrosion-resistant and icephobic. Byrd provides no information on adhesion strength between the icephobic coating and the underlying substrate.

Butts et. al. in U.S. Patent Publication 2011/0143148 disclose an article comprising a weather resistant coating on its outer surface exposed to precipitation or airborne debris. The coating comprises two components: (a) a one-part or two-part room temperature vulcanizable polyorganosiloxane composition; and (b) an ice release-enhancing proportion of at least one polyorganosiloxane composition comprising one or more silanol or alkoxy-silyl groups and comprising from about 10 weight percent to about 85 weight percent of at least one hydroxy-terminated or alkoxy-terminated polyoxyalkylenealkyl radical. In another embodiment, an article comprises a weatherable surface exposed to precipitation or airborne debris; and a weather resistant coating disposed on the weatherable surface, wherein the coating includes a one-part or two-part addition curable polyorganosiloxane composition comprising a resin polymer and a crosslinker, wherein the resin polymer and/or crosslinker comprises an ice release-enhancing proportion of covalently bound hydrophilic functionality that contains between about 0.5 weight percent to about 40 weight percent of the coating composition. Butts provides no information on adhesion strength between the icephobic coating and the underlying substrate.

Nowak et. al. in U.S. Patent Publication 2014/0162022 disclose structural coatings with dewetting and anti-icing properties which are impact-resistant, and coating precursors for fabricating same. Dewetting and anti-icing performance is simultaneously achieved in a structural coating comprising multiple layers, wherein each layer includes (a) a continuous matrix; (b) discrete templates dispersed that promote surface roughness to inhibit wetting of water; and (c) nanoparticles that inhibit heterogeneous nucleation of water. These structural coatings can be applied by spraying and the use of multiple layers extends the lifetime, as in case the surface is damaged during use, freshly exposed surface will expose a coating identical to that which was lost. Nowak provides no information on adhesion strength between the icephobic coating and the underlying substrate.

Harmer et. al. in WO 2015/094917 disclose substrates coated with a multilayer film having low ice adhesion. The multilayer film comprises a first layer that is a polymer having a thickness of greater than 0.9 mm and less than 10 mm, a Shore A hardness of less than about 100 and a flex modulus in the range of from 1 kPa to 100 GPa. The second film layer of the multilayer film is a polymer that has a thickness of less than 100 μm, a water contact angle of greater than 60°. The first second film layers can flex without separating or without forming cracks. Harmer provides no information on adhesion strength between the icephobic coating and the underlying substrate.

Tuteja et. al. in WO 2016/176350 disclose durable icephobic coatings for aircrafts, powerlines, vehicles, marine structures, communications towers, outdoor equipment, and the like. The icephobic material may comprise an elastomeric polymer with a low crosslink density (e.g., ≤1,300 mol/m$^3$) and low initial ice adhesion strength (e.g., $\tau_{ice}$≤100 kPa prior to exposure to icing conditions). Furthermore, the icephobic material maintains Tice after 10 icing/deicing cycles that is ≥50% of the initial $\tau_{ice}$. Introducing optional miscible liquids enhances interfacial slippage of chains in the elastomeric polymer. The low $\tau_{ice}$ levels minimize ice buildup and any accumulated ice spalls off during normal operation. Other icephobic materials include linear polymers with plasticizers distributed therein or PDMS-silane coatings, both of which are free of any layers of surface liquids. Tuteja provides no information on adhesion strength between the icephobic coating and the underlying substrate.

Thus, there is a particular need for articles containing an adherent, durable, hydrophobic and icephobic coating on their outer surface.

SUMMARY OF THE INVENTION

A variety of articles are made of metallic materials that are used in atmospheric conditions where their outer surface is exposed to rain, snow and/or ice. It is also well known that relatively thin, grain-refined and/or amorphous metallic coating can be applied to softer metals, including, but not limited to, Al and Ti, as well as polymeric materials, including, but not limited to, thermoplastics and thermosets which may be filled with, e.g., carbon or glass fibers for use in applications requiring high specific strength and durability. It is also well known that articles made from conventional, unfilled/unreinforced as well as fiber reinforced polymers (FRP) and carbon fiber reinforced polymers (CFRP) are frequently employed in outdoor applications including, but not limited to, sporting goods as well as in transportation systems such vehicles traveling on land, in water or air.

As noted above, it is known to minimize the adverse effect of atmospheric conditions on articles made of various metals as well as articles comprising non-metallic substrates, e.g., polymer and polymer composite substrates, by applying a coating on their outer surface to render them water repellent and/or to lower ice adhesion. For instance, per-fluoroalkyl silanes have been employed in surface coatings to reduce ice adhesion. However, compositions of this type lose their water-repellency rather quickly and need to be regenerated frequently, i.e., they are considered to contain "consumable" components. Quaternary ammonium siloxane-based materials have been incorporated, e.g., into windshield washing fluids, but this approach fails to provide a durable anti-icing coating and readily washes away during use. Attempts to utilize silicone rubbers, silicone oils and polyisoprenes have not been successful as they undergo rapid wear, are lost from the outer surface and furthermore they take up oils and dirt. Furthermore, typical additives used to lower ice adhesion including, but not limited to, silicones, also reduce the adhesion of the coating to its underlying substrate causing the coating to delaminate and spall off during use.

The inventors of the present disclosure have recognized that selected properties desired of the icephobic coating on the exposed outer surface are diametrically opposed to selected properties required on the inner surface of the icephobic coating which is in intimate contact with the underlying article/substrate. The inventors have surprisingly discovered that a multilayered or graded organic coating applied to the metallic or polymeric substrates provides unprecedented hydrophobicity, icephobicity, durability and adhesion while providing excellent cohesive strength. The inventors have furthermore discovered that icephobic coatings can be designed to be hydrophilic or hydrophobic although, in this specification, hydrophobic surfaces are preferred as such coatings repel water as well as readily shed snow and ice.

The inventors of the present disclosure have also discovered that the outer surface of the inventive coating be preferably smooth ($R_a$<1 μm), as textured/roughened surfaces such as textured superhydrophobic surfaces, under certain conditions, can have increased ice adhesion, particularly in the case of frost formation and only show low ice-adhesion if a liquid, e.g., supercooled water droplets, hit the surface. In contrast, the inner surface of the inventive coating at any solid interface is preferably rough ($R_a$>1 μm) to enhance the adhesion between the coating and, e.g., the underlying substrate.

It is therefore an objective of the present invention to utilize articles made of durable polymeric materials or metallic materials comprising an amorphous and/or crystalline microstructure and rendering the outer surface hydrophobic and/or icephobic by applying an adherent, polymeric, durable, hydrophobic and/or icephobic coating.

It is an objective of the present invention to provide articles wherein the icephobic material coating surface extends over between 1% and 100% of the total exposed outer surface of the article.

It is an objective of the present invention to provide icephobic coatings having a total thickness of at least 10 microns, preferably in the range of 25 to 250 microns (cured loading: ~3-30 mg/cm$^2$), preferably between 50 and 100 microns (cured loading: ~6-12 mg/cm$^2$).

It is an objective of the present invention to provide durable, scratch and abrasion resistant, strong, lightweight articles for use in various applications including, but not limited to, transportation applications (including automotive, aerospace, ships and other vessels navigating on land, in air, space and on water, and their components), defense applications, industrial components, building materials, consumer products, electronic equipment or appliances and their components, sporting goods as well as any other outdoor equipment.

It is an objective of the present invention to render the outer surface of articles hydrophobic (contact angle for water greater than 90°), preferably greater than 120°, preferably super-hydrophobic (contact angle for water greater than 150°).

It is an objective of the invention to render the outer surface of articles self-cleaning by suitably creating a low roll-off angle (tilt angle for water less than 25°), preferably a tilt angle for water less than 20°, more preferably less than 10° or even 5°, by an economic, convenient and reproducible process.

It is an objective of the present invention to achieve excellent adhesion between the organic coating and the outer surface of articles by creating a rough/textured surface at the interface between the article/substrate and the applied coating, i.e., generating a surface roughness ($R_a$) of more than 0.5 microns, preferably more than 0.75 microns, and more preferably more than 1 microns.

It is an objective of the present invention to render the outer surface of articles hydrophobic and icephobic by applying a coating with a smooth exposed surface characterized by a surface roughness ($R_a$) less than or equal to 1 micron, preferably <0.75 microns, and more preferably <0.5 microns.

It is another objective of the present invention to provide a coating having a polymeric outer layer which at room temperature, in its cured form, does not contain any fluids, e.g., silicone oils.

It is an objective of the present invention to provide lightweight articles comprising, at least in part, liquid repellent and/or self-cleaning outer surfaces which also display low ice-adhesion strength with increased wear, erosion and abrasion resistance, durability, strength, stiffness, thermal conductivity and thermal cycling capability.

It is an objective of the present invention to provide an outer surface with a low ice-adhesion strength which is largely maintained after repeated icing/deicing cycles using, after curing, solid and "permanent" icephobic additions as opposed to, after curing, sacrificial, consumable icephobic additions such as lubricating liquids such as oils which rapidly get consumed and/or lost from the surface resulting in a rapid rise of the ice-adhesion strength with repeated icing/deicing cycles or time exposed to the environmental elements due to, among other, wind, rain, and ice erosion.

It is an objective of the present invention to provide coated articles with an outer surface having an ice-adhesion strength on the first cycle, as well as on the $5^{th}$ or $7^{th}$ cycle, of no greater than 500 kPa, preferably no greater than 400 kPa, preferably no greater than 350 kPa, preferably no greater than 200 kPa, and more preferably no greater than 150 kPa, when measured according to ERDC/CRREL Technical Note 03-4.

It is an objective of the present invention for the outer surface of the coated articles to have a Shore D-scale hardness of at least 10, preferable 15, preferable 20, preferable 25, more preferably 50, and more preferably 60.

It is an objective of the present invention for the outer surface of the coated articles disclosed to have a sand erosion value according to standard ASTM G76 at 90 degrees of less than 10 $mm^3/kg$, preferably less than 7.5 $mm^3/kg$, and preferably less than 5 $mm^3/kg$.

It is an objective of this invention to provide coated articles composed of icephobic, polymeric outer coatings on metallic materials including, but not limited to, Al, Co, Cu, Fe, Ni, Sn, Ti and Zn and their alloys, and/or polymeric materials including, but not limited to, polyamides and carbon fiber composites, having a "pull-off strength" between the substrate/article and the icephobic outer layer according to standard ASTM 4541D of at least 250 psi (1.73 MPa), preferably at least 300 psi, preferably at least 400 psi, preferably at least 800 psi, preferably at least 900 psi, preferably at least 1,000 psi and preferably at least 1,200 psi.

It is an objective of this invention to provide coated articles composed of a icephobic polymeric outer coatings on metallic and/or polymeric materials showing no failure such as delamination according to ASTM B553-71 for service condition 1 (60° C. to −30° C.), preferably service condition 2, preferably service condition 3 and even more preferably for service condition 4.

It is an objective of this invention to provide coated articles capable of withstanding 1, preferably 5, more preferably 10, more preferably 20 and even more preferably 30 temperature cycles without failure according to ANSI/ASTM specification B604-75 section 5.4 (Standard Recommended Practice for Thermal Cycling Test for Evaluation of Electroplated Plastics ASTM B553-71) for service condition 1 (60° C. to −30° C.), preferably service condition 2, preferably service condition 3 and even more preferably for service condition 4.

It is an objective of the present invention to provide coated articles with at least in part icephobic and liquid repellent and/or self-cleaning outer surfaces for a variety of applications including, but not limited to:

aerospace parts and components including, but not limited to, wings, wing parts including flaps and access covers, structural spars and ribs, propellers, rotors and rotor blades, stators and stator vanes, rudders, covers, fuselage parts, nose cones, and landing gear;

automotive components including, but not limited to, heat shields, oil, transmission and brake parts, fluid tanks and exposed housings including oil and transmission pans, spoilers, grill-guards and running boards, vehicle chassis parts including hood, doors and side panels, gas tanks and engine covers;

sporting goods including, but not limited to, hockey sticks, skate blades, helmets, golf shafts, heads, balls and faceplates, ski and snowboard components including bindings, and bicycle parts; and industrial/consumer products and parts including, but not limited to, solar panels, turbines and windmills;

According to exemplary embodiments of the present invention, a method is provided for manufacturing an article having an exposed surface, comprising at least portions that are rendered hydrophobic and/or icephobic.

Accordingly, in one embodiment, the present invention provides a durable, icephobic, non-isotropic article comprising:

(i) at least one metallic material layer having a total thickness of at least 25 microns comprising at least one metal chosen from the group consisting of Al, Co, Cu, Fe, Ni, Sn, Ti and Zn;

(ii) a layered and/or graded anisotropic polymeric coating having a total thickness of at least 10 microns applied to at least part of the outer surface of the metallic material layer and in intimate, direct contact therewith comprising:

(a) a cured first chemical composition comprising a polymeric resin at an interface between said polymeric coating and said metallic material layer extending at least 2.5 microns in height from the outer surface of the metallic material layer;

(b) a cured second chemical composition comprising the polymeric resin and an icephobic material addition forming an exposed outer surface of said non-isotropic article extending at least 2.5 microns in depth from the exposed outer surface which, after curing:

(i.b) contains an icephobic material addition composed entirely of solids representing up to 25% by weight of the cured second chemical composition;

(ii.b) has a Shore D-Scale Hardness of at least 20;

(iii.b) has a sand erosion value according to standard ASTM G76 at an impingement angle of 90 degrees of less than 10 $mm^3/kg$;

(iv.b) is hydrophobic; and (v.b) has an ice adhesion of less than 200 kPa as prepared and of less than 350 kPa after 5 icing/deicing cycles when measured according to ERDC/CRREL Technical Note 03-4;

said non-isotropic article exhibiting:

(i) no failure after being exposed to at least one temperature cycle according to ASTM B553-71 service condition 1; and (ii) the pull-off strength between the metallic material layer and an exposed outer surface of the polymeric coating, according to standard ASTM 4541D is at least 300 psi.

Accordingly, in another embodiment, the present invention provides a durable, icephobic, non-isotropic article comprising:

(i) at least one polymer or polymer composite material layer having a total thickness of at least 25 microns;

(ii) a layered and/or graded polymeric anisotropic coating having a total thickness of at least 10 microns applied to at least part of an outer surface of the polymer or polymer composite material layer and in intimate, direct contact therewith comprising:
   (a) a cured first chemical composition comprising a polymeric resin at an interface between said polymeric coating and said polymer or polymer composite material layer extending at least 2.5 microns in height from the outer surface of the polymer or polymer composite material layer;
   (b) a cured second chemical composition comprising the polymeric resin and an icephobic material addition forming an exposed outer surface of said non-isotropic article extending at least 2.5 microns in depth from the exposed outer surface which, after curing:
      (i.b) contains an icephobic material addition composed entirely of solids representing up to 25% by weight of the cured second chemical composition layer;
      (ii.b) has a Shore D-Scale Hardness of at least 20,
      (iii.b) has a sand erosion value according to standard ASTM G76 at an impingement angle of 90 degrees of less than 10 mm$^3$/kg;
      (iv.b) is hydrophobic; and
      (v.b) has an ice adhesion of less than 200 kPa as prepared and of less than 350 kPa after 5 icing/deicing cycles when measured according to ERDC/CRREL Technical Note 03-4;
   said non-isotropic article exhibiting:
   (iii) no failure after being exposed to at least one temperature cycle according to ASTM B553-71 service condition 1; and
   (iv) the pull-off strength between the polymer or polymer composite material layer and an exposed outer surface of the polymeric coating, according to standard ASTM 4541D is at least 300 psi.

Accordingly, the invention in one exemplary embodiment is directed to an article having on its outer surface a polymeric material coating which is smooth ($R_a$<2.5 microns, preferably <1 micron and more preferably <0.5 microns), hydrophobic and icephobic.

Accordingly, the invention, in another exemplary embodiment is directed to a polymeric coating which adheres well to a metallic or polymeric substrate and, at and near the exposed outer surface, comprises a polymeric material containing one or more silicone additives, e.g., modified silicones.

The following further defines the article of the invention:
Substrate Specification:

In one embodiment the base article/substrate the coating is applied to is a metallic material. Typical metals and alloys used comprise at least one element selected from the group consisting of Al, Co, Cr, Cu, Fe, Mg, Ni, Sn, Ti, W, Zn, and Zr, with alloying additions consisting of B, P, C, Mo, S, and W, and particulate additions consisting of carbides, oxides, nitrides and carbon (carbon nanotubes, diamond, graphite, graphite fibers, graphene).

In another embodiment the base article/substrate the coating is applied to can also be a polymeric material comprising at least one of: thermosets such as unfilled or filled epoxy, phenolic or melamine resins, polyester resins, urea resins; thermoplastic polymers such as thermoplastic polyolefins (TPOs) including polyethylene (PE) and polypropylene (PP); polyamides, mineral filled polyamide resin composites; polyphthalamides, polyphtalates, polystyrene, polysulfone, polyimides; neoprenes; polybutadienes; polyisoprenes; butadiene-styrene copolymers; poly-ether-ether-ketone (PEEK); polycarbonates; polyesters; liquid crystal polymers such as partially crystalline aromatic polyesters based on p-hydroxybenzoic acid and related monomers; polycarbonates; acrylonitrile-butadiene-styrene (ABS); chlorinated polymers such polyvinyl chloride (PVC); and fluorinated polymers such as polytetrafluoroethylene (PTFE). Polymers can be crystalline, semi-crystalline or amorphous.

Filler additions can include metals, metal oxides, carbides, carbon (carbon, carbon fibers, carbon nanotubes, diamond, graphite, graphite fibers and graphene), glass, glass fibers, fiberglass, metallized fibers such as metal coated glass fibers, mineral/ceramic fillers such as talc, calcium silicate, silica, calcium carbonate, alumina, titanium dioxide, ferrite, mica and mixed silicates (e.g. bentonite or pumice).

Substrates/base articles are made or shaped by any convenient manufacturing process. It is desirable to suitably prepare a surface of the substrates/base article before it receives a coating. The pretreatment can involve a cleaning step followed by a suitable mechanical or chemical process which increases the surface roughness.

Polymeric Coating Specification:

The polymeric coating contains a curable resin which can be any thermoset resin that can be cured or "set" by crosslinking. Particularly suitable are epoxy resins including, but not limited to, solid and liquid epoxies from Bisphenol A, Bisphenol F, Diglycidyl Ether of Bisphenol A (DGEBPA), Diglycidyl Ether of Bisphenol F (DGEBPF), Modified epoxies including Carboxyl terminated Butadiene acrylonitrile polymer (CTBN) adducted epoxies of DGBPA and DGBPF, and Cresyl Glycidyl Ether or n-Butyl Glycidyl Ether or Phenyl Glycidyl Ether modified epoxy resins of DGBPA and DGBPF. Preferred polymeric resins are an epoxy resin with an epoxy-equivalent weight (EEW) between 100 and 1,000, preferably between 200 and 750.

The polymeric coating can also contain an elastomer such as any alkadiene polymer, e.g., neoprene rubber; isoprene rubber; butadiene rubber, and the like. Modified epoxies containing rubber or silicone adducts are also suitable. In addition, elastomers can include polyurethanes, ethylene-propylene rubbers (EPR, sometimes called EPM referring to an ASTM standard), ethylene-propylene-diene rubber (EPDM) and silicone based elastomers. Preferred rubbers are carboxyl terminated butadiene acrylonitrile polymers (CTBN) and/or amine terminated butadiene acrylonitrile polymers (ATBN). The polymer coating can be elastomer free (0%), in case elastomers are used its content in any cured layer preferably is kept to no more than 60%, preferably less than 50%, more preferably less than 40%, and less than 30% of the weight of the curable resin or the total weight of the cured layer. When elastomers are present, the elastomer content is preferably at least 5%, more preferably at least 10%, and even more preferably at least 20%. The elastomer does not need to be present throughout the coating in the deposition direction, e.g., an elastomer in the bonding layer in contact with the substrate may be beneficial whereas it is not necessarily required in the outer, icephobic layer, unless it is also the icephobic additive or it is added to, e.g., reduce the Shore D hardness of the outer layer to render it soft and flexible to enhance the shedding of ice.

The polymeric coating typically contains a curing agent. Any curing agent known in the art is suitable for this purpose. Particularly suitable are curing agents selected from the group consisting of amide-type, amine-type and imidazole-type curing agents, more particularly imidazole-type curing agents as well as noble metals. The amount of curing agent is kept to no more than 20%, more preferably less than 10%, and less than 7.5% by weight of the cured layer and/or the weight of the resin, e.g., the epoxy resin content, in the formulation.

The polymeric coating can be fiber reinforced. Examples of reinforcing fibers include glass fibers, aramide fibers, carbon fibers, carbon nanotubes, and the like. Other additives can include fluorinated polymers such as polytetrafluoroethylene (PTFE) or fluorinated silicones as well as pigments to provide a coating with any desirable color.

In general, the resin compositions used for forming the polymeric coating can be cured at temperatures below 150° C. For example, curing at about 140° C. for 2 hours, or at 120° C. for 4 hours is generally sufficient to accomplish substantially full curing. Under certain circumstances, however, e.g., for use in repair and overhaul, compositions which cure at room temperature are desirable.

An annealing step can be added to increase the adhesion between the polymeric coating layers and between the polymeric coating and the underlying substrate. The annealing step is a heat treatment step, similar to the curing step, in terms of temperature and duration.

As indicated, the inventive polymeric coating is not homogenous in the deposition direction but layered and/or graded to enable the outer surface to be icephobic due to the presence of an "icephobic additive" whereas the composition of the polymeric coating near the inner surface is optimized for maximizing the bond strength between the organic coating and the underlying substrate.

In addition to thermosets, polymeric coating can also be formulated using thermoplastics such as thermoplastic polyurethanes (TPU).

Icephobic Additive Specification:

Icephobic material additions include paraffins, silicones (polysiloxane), preferably epoxy-modified silicones, fluorinated silicones, fluorocarbons, polyurethanes such as polyurethane rubber, fluorinated polyols, polyethers, fluorocarbon elastomers and combinations thereof. The icephobic addition content preferably represents at least 1%, preferably at least 2.5%, more preferably at least 5%, more preferably at least 10%, and even more preferably at least 15% and up to 20% and preferably up to 25% of the weight of the cured layer and/or the weight of the resin, e.g., the epoxy resin content, in the formulation.

Silicones (polysiloxanes) are particularly preferred additives for achieving icephobic behavior. Silicone elastomers are often referred to as silicone-based polymers that have been vulcanized. Albeit technically incorrect, the term "silicone rubber" is often used since it is more descriptive. Silicone elastomers or silicone rubber materials are readily available in a hardness ranging from 10 durometer Shore A (extremely soft) to 60 durometer Shore A (firm, medium soft to medium hard). Properties of silicones are determined by the organic groups attached to the silicon atoms, and can be fluids, resinous materials or rubbery materials. "Silicones" are typically water-repellent and are used as adhesives, lubricants, hydraulic oils and caulks (sealants). For the purpose of increasing icephobicity, silicones with low surface energy and excellent elasticity are desired. As noted above, NuSil™ R-2180 from NuSil Technology, LLC, Santa Barbara, Calif., USA, which is a two-part silicone elastomer dispersed in xylene, is a commonly used commercially icephobic coating.

Particularly suitable icephobic additives include reactive silicones which are multifunctional silicone pre-polymers with reactive terminal end groups such as epoxy-modified silicones.

Definitions:

The term "substrate" as used herein means a structural product that can be used as a base for an article.

As used herein, the term "metal matrix composite" (MMC) is defined as particulate matter embedded in a metallic matrix.

As used herein, the term "filled" or "reinforced" refers to polymer resins which contain fillers embedded in the polymer, e.g., fibers made of carbon, graphite, carbon nanotubes, graphene, glass and metals; powdered mineral fillers (i.e., average particle size 0.01-25 microns) such as talc, calcium silicate, silica, calcium carbonate, alumina, titanium oxide, ferrite, and mixed silicates. A large variety of filled polymers having a filler content of up to about 75% by weight or volume are commercially available from a variety of sources.

As used herein, "prepreg" is an abbreviation for pre-impregnated reinforcement fabric and/or fiber mats which are commercially available and used to provide structure and reinforcement for composite articles. The prepreg member is either a dry or wet lay-up component. A dry lay-up is typically a pre-formed structure partially formed prior to being placed onto the release layer. A wet lay-up consists of placing a fabric or fibers onto the release layer, whereupon a liquid epoxy composition is subsequently poured onto the fibers to impregnate the fibers. A partial curing step may be applied to the prepreg member where necessary.

As used herein, the term "coating" means a deposit layer applied to part or all of an outer surface of a substrate.

As used herein, the term "coating thickness" or "layer thickness" refers to the depth in the deposition direction and typical thicknesses exceed 25 microns, preferably 100 microns.

The term "bonding layer" as used herein refers to an intermediate layer directly adjacent to the substrate and between the substrate and the outermost coating layer exposed to the elements of the article of manufacture.

As used herein, "exposed surface" and "outer surface" refer to all accessible surface area of an object accessible to the atmosphere and/or a liquid. The "exposed surface area" refers to the summation of all the areas of an article accessible to a liquid.

As used herein, "surface roughness", "surface texture" and "surface topography" mean a regular and/or an irregular surface topography containing surface structures. These surface irregularities/surface structures combine to form the "surface texture".

As used herein the term "smooth surface" is characterized by a surface roughness ($R_a$) less than or equal to 1 micron.

The term "epoxy" or "epoxy resin" as used herein refers to a flexible usually thermosetting resin made by copolymerization of an epoxide with another compound having two hydroxyl groups and used predominately in coatings and adhesives.

The term "curable epoxy resin" as used herein refers to resins relying on a ring opening reaction of the epoxy functional group to polymerize/cross-link.

The term "polyurethane" as used herein refers to polymers composed of organic units joined by carbamate (urethane) links. While most polyurethanes are thermosetting polymers that do not melt when heated, thermoplastic polyurethanes are also available. Polyurethane polymers are commonly formed by reacting a di- or tri poly-isocyanate with a polyol. Since polyurethanes contain two types of monomers, which polymerize one after the other, they are classified as alternating copolymers.

The term "epoxy equivalent weight" or "EEW" as used herein is used for formulating epoxy adhesive compositions. EEW is defined as the weight of a resin in grams that contains one equivalent of epoxy.

The term "adhesion promoters" as defined herein contains additives which improve adhesion and strongly adsorb onto the surface of the substrate. Ideally, the adsorption is so strong that rather than being a physical adsorption it has the nature of a chemical bond. Adhesion promoters act at the interface between an organic polymer and an inorganic substrate to enhance adhesion between the two materials.

The term "elastomer" as used herein refers to amorphous polymers maintained above their glass transition temperature, so that considerable molecular reconfirmation, without breaking of covalent bonds, is feasible. At ambient temperatures, elastomers are thus relatively soft and deformable. Examples of elastomers include polyisoprene (natural and synthetic "rubbers), polyurethanes and silicones (silicone "rubbers").

The term "rubber" as used herein refers to any polymer comprising an alkadiene (isoprene) as one of its monomers.

The term "silicones", also known as "polysiloxanes" as used herein refers to polymers that include any synthetic compound made up of repeating units of siloxane or (—Si—O—Si—O—)$_n$, which is a chain of alternating silicon atoms and oxygen atoms, combined with carbon, hydrogen, and sometimes other elements.

The term "epoxy modified silicone" as used herein refers to reactive silicones, which can be used to create epoxy-silicone hybrids of high durability. By combining the advantages of epoxies (e.g., good adhesion, high abrasion resistance and good mechanical strength but poor UV stability and low hydrophobicity) and silicones (e.g., good flexibility and elongation, excellent UV stability and hydrophobicity but poor abrasion resistance and adhesion) excellent properties can be obtained.

The term "curing" as used herein refers to cross-linking process that results in a three-dimensional molecular polymeric structure.

The term "curable resin" refers to a resin composition that can be cured by crosslinking.

The term "substantially fully cured" refers to a curable resin that has been subjected to a heat treatment at a temperature that is high enough, and for a time that is long enough, to result in a completion of the crosslinking process.

As used herein the term "curing agent" refers to a substance that is used to harden a material. It is typically applied to polymers to facilitate the cross-linking and bonding of its molecular components.

The term "cross-link" as used herein refers to a bond that links one polymer chain to another. These links may take the form of covalent bonds or ionic bonds and the polymers can be either synthetic polymers or natural polymers.

As used herein, the term "contact angle" or "static contact angle" is referred to as the angle between a static drop of deionized liquid water and a flat and horizontal surface upon which the droplet is placed and, unless otherwise indicated, is determined at room temperature.

As used herein the term "hydrophilic" is characterized by the contact angle for water obtained at room temperature of less than 90°, which means that the liquid water droplet wets the surface.

As used herein the term "hydrophobic" or "wetproof" is characterized by the contact angle for liquid water obtained at room temperature of greater than 90°, which means that the water droplet does not wet the surface.

As used herein, "super-hydrophobic" refers to a contact angle for deionized water at room temperature equal to or greater than 150° and "self-cleaning" refers to a tilt angle of equal to or less than 5°.

As used herein, the term "tilt angle" or "roll-off angle" means the smallest angle between a surface containing a water droplet and the horizontal surface at which the droplet commences to and keeps rolling off at room temperature.

As used herein, the term "icephobic" or "pagophobic" means the ice adhesion strength according to the ice adhesion test described by the U.S. Army Engineer Research and Development Center is less than 300 kPa.

As used herein the term "ice adhesion test" is the one described by the U.S. Army Engineer Research and Development Center, Hanover, N.H., USA, in the ERDC/CRREL Technical Note 03-4 (October 2003).

The term "pull-off strength" as used herein refers to the strength of the adhesive bond between the layered metal construct and the bonding layer (or between the bonding layer and the substrate, whichever is lower). Pull-off strength is measured according to standard ASTM 4541D; its dimension is [force]/[length]. Test results are reported in psi units or, more properly, MPa (1 psi=0.0069 MPa).

As used herein "thermal cycling performance" is characterized by the ANSI/ASTM specification B604-75 section 5.4 Test (Standard Recommended Practice for Thermal Cycling Test for Evaluation of Electroplated Plastics ASTM B553-71). In this test the samples are subjected to a thermal cycle procedure as indicated in Table 1. The sample is held at the high temperature for an hour, cooled to room temperature and held at room temperature for an hour and subsequently cooled to the low temperature limit and maintained there for an hour.

TABLE 1

Thermal Cycle Procedure Information

| Service Condition | High Limit | Low Limit |
|---|---|---|
| 1 (mild) | 60° C. | −30° C. |
| 2 (moderate) | 75° C. | −30° C. |
| 3 (severe) | 85° C. | −30° C. |
| 4 (very severe) | 85° C. | −40° C. |

The term "Shore hardness" as used herein refers to a measure of the resistance a material has to indentation. There are three different Shore Hardness scales (00, A and D) for measuring the hardness of different typically polymeric materials (supersoft gels, soft elastomers and rigid plastics).

As used herein the term "sand erosion" refers to a material loss of an article caused by sand impingement. The ASTM G76 "Standard Test Method for Conducting Erosion Tests by Solid Particle Impingement Using Gas Jets" measures the material loss of a surface caused by gas-entrained solid particle impingement with sand from a jet-nozzle This test method can be used for determining erosion for various particle sizes, velocities, attack angles, environments, etc. The ASTM G76 Conditions used in this specification include an impingement angle as indicated, $Al_2O_3$ powder abrasive with an average particle size of 50 μm, a gas pressure of 20 psi, a blast duration of 1 min, a particle feed rate of 10.0±2.0 g/min, a distance between the test coupon and nozzle tip of 50±1 mm, compressed nitrogen as the carrier gas, an ambient test temperature, and flat sample panels. The person skilled in the art will know that the erosion rate under otherwise similar conditions depends on the impingement angle. While an impingement angle of 90° is commonly used to characterize various materials, depending on the ductility of the substance being tested, the erosion rate can vastly change with the impingement angle, i.e., ductile materials typically have the lowest erosion rate at 90°, whereas brittle materials experience the lowest erosion values at very low impingement angles as indicated, e.g., in J. Vite-Torres et. al., "Solid Particle Erosion on Different Metallic Materials" Tribology in Engineering, Chapter 5, Intech Open Science, 2013.

BRIEF DESCRIPTION OF THE DRAWINGS

The features and advantages of the invention will be appreciated upon reference to the following drawings, in which.

DETAILED DESCRIPTION OF THE INVENTION

Figure 1:
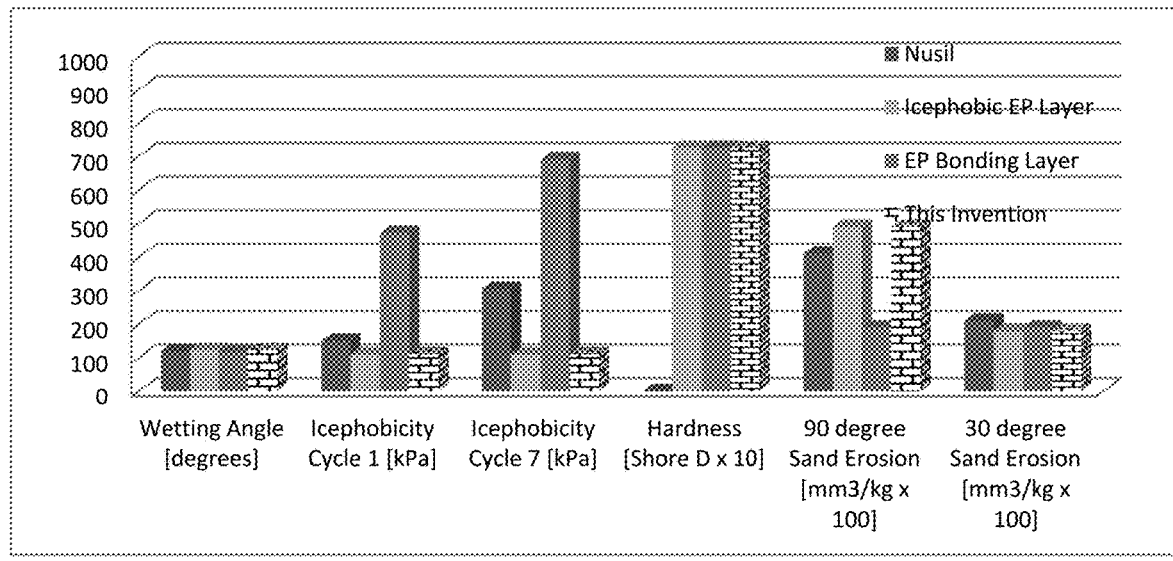
FIGS. 1 and 3 are graphs showing the wetting angle, ice adhesion, Shore D hardness as well as the sand erosion properties for impingement angles of 90° and 30° for various polymeric coatings.

It is well known that the formation, adhesion, and accumulation of ice, snow, frost, glaze, rime, or their mixtures can cause severe problems for solar panels, wind turbines, aircrafts, heat pumps, power lines, telecommunication equipment, as well as land vehicles and marine vessels. These problems generate safety hazards and can result in failure. To address these issues, the fundamentals of interfaces between gases, liquids and solids and solid surfaces at low temperatures need to be taken into account and various approaches to form "icephobic" (pagophobic) surfaces have been proposed. As the person skilled in the art knows different properties may be required to prevent the formation and adhesion of ice, snow, glaze, rime, and frost.

Icephobicity is the ability of a solid surface to repel ice or prevent ice formation due to a certain topographical structure and/or chemical composition of the surface. Icephobic surfaces in this specification are defined by an ice adhesion strength of typically <350 kPa, preferably <300 kPa, and more preferably <200 kPa. Slippery, liquid infused porous surfaces (SLIPS) have been proposed for reducing ice adhesion to values as low as 10 kPa, however, after a few icing-deicing cycles, ice adhesion gradually increases to over 200 kPa. Furthermore, the mechanical durability of SLIPS surfaces is typically poor. Many other approaches have been proposed as well which are capable of reducing the icephobicity, however, achieving and maintaining both icephobicity and long-term durability remains a challenge.

In order to enhance icephobicity, the exposed surface needs to generally exhibit poor adhesion characteristics, however, in most of the commercial applications the icephobic material layer is applied as a homogeneous coating onto a suitable substrate. As a consequence, the "inner surface" of such icephobic coatings, e.g., the surface contacting the underlying substrate, exhibits poor adhesion particularly when containing liquid icephobic additives. Delamination and flaking of the polymeric coating at the interface with the underlying substrate frequently limit its durability even if the coating is formulated to be hard and strong.

In this specification therefore the inventors of the present disclosure propose to form anisotropic, icephobic coatings by minimizing adhesion on the exposed outer surface while maximizing adhesion on the inner surface to achieve a good bond at the interface with the underlying substrate. This is achieved by modifying the composition of the icephobic material coating in the deposition direction through layering and/or gradually modulating the chemical composition. In its simplest form the coating contains two layers of different composition.

Epoxies are known for achieving excellent adhesion to a number of substrates including metals due to their polar nature and their ability to create chemical bonds to the surface upon cure. Hard and strong due to high crosslinking, cured epoxies can bear loads and resist wear caused by abrasion over the long term. This good mechanical strength, however, at high crosslink density flexibility decreases and epoxies are known for cracking due to their brittleness and inability to dissipate stresses. Cured epoxies layers require the addition of icephobic material additives to notably reduce ice-adhesion strength.

Similarly, polyurethanes are commonly employed as coatings for preventing corrosion of metal articles and to make a variety of materials more durable. Polyurethanes are extremely resilient substances and their mechanical properties can be easily manipulated by optimizing their compositions.

Silicones exhibit high elongation and flexibility that enable the dissipation of stresses and applied energy. Their strong Si—O bond and high surface energy make silicones resistant to atmospheric or chemical attack and less susceptible to degradation from sunlight, water uptake and ultraviolet (UV) light, thereby providing hydrophobic and icephobic properties for extended periods of time.

The inventors of the present disclosure have discovered that combining the adhesion, abrasion resistance and mechanical strength of epoxies with the thermal stability, flexibility and icephobicity of silicones in hybrid systems yields strong and flexible materials with higher resistance to cracking in harsh environments while providing hydrophobic and icephobic properties. Starting out at the metallic or polymeric substrate surface representing the inner coating surface by applying a polymeric coating with a high epoxy content, preferably being substantially free of silicones or having a low silicone content assures a good bond between the polymeric coating and the underlying substrate. Then, as the thickness of the polymeric coating increases, the silicone contents in the deposition direction towards the outer exposed surface can be gradually or stepwise increased. Consequently, a polymeric coating is formed ending up with the highest silicone content at the outer, exposed surface, thus providing for an anisotropic polymeric coating which maintains excellent adhesion to the substrate surface while being icephobic on the exposed, outer surface. In one preferred embodiment the same epoxy resin is used throughout the coating, i.e., in both the bonding and the icephobic layer.

Similarly, substituting polyurethanes based coatings for epoxies using otherwise the same approach can yield durable coatings with excellent icephobic properties and high adhesion to the underlying substrates.

This invention relates to articles comprising durable, icephobic coatings. In its broadest aspect the present invention relates to article of manufacture comprising:

(i) a substrate comprising a metallic or polymeric material having an outer surface in direct contact with
(ii) an anisotropic polymeric coating which
  (a) on the interface between said polymeric coating and said substrate contains a substantially fully cured organic resin and is substantially free of icephobic additives; and
  (b) on its exposed outer surface contains the same substantially fully cured organic resin and furthermore contains one or more solid icephobic additives.

In one preferred embodiment the substrate comprises a metallic material. Examples of suitable metallic materials include metals and alloys of aluminum, cobalt, magnesium, steel, nickel and titanium. The substrate can be an isotropic, layered or graded metallic construct comprising one or more continuous metal layers wherein at least one of the continuous metal layers is a microcrystalline and/or amorphous metal layer or a grain-refined layer having a grain size below 5,000 nm.

In another preferred embodiment the substrate comprises a polymer or polymer composite. Suitable polymers include any known thermoplastic or thermoset. Suitable polymer composites can contain a material selected from the group consisting of carbon, carbon fibers, graphite, graphite fibers, carbon nanotubes and graphene. Other additions such as glass, glass fibers, as well as inorganic and organic fibers are contemplated as well.

The polymeric coating applied to the substrate is anisotropic in the deposition direction, e.g., layered or compositionally graded. The composition of the polymeric coating in contact with the substrate and near the interface with the substrate is chosen to maximize the adhesion strength between the polymeric coating and the substrate. In contrast, the composition of the exposed outer surface of the polymeric coating is chosen to maximize erosion performance and icephobic properties. The transition of the composition of the polymeric coating from the "bonding surface" to the "icephobic surface" can be gradual, e.g., by changing the chemical composition from an epoxy or polyurethane rich and silicone free to an epoxy or polyurethane and silicone containing outer surface providing a graded polymer layer. Alternatively, distinct layers of various compositions can be applied to transition from an epoxy or polyurethane rich, silicone-free to an epoxy or polyurethane and silicone containing outer surface. In the case of layering, at a minimum, two distinct polymer layers are applied; however, a multilayer laminate with a total of up to 100 sublayers can be applied. Combination of layered and graded sublayers is also included in the scope of this invention.

In an alternative embodiment the anisotropic polymeric coating is not directly applied to the substrate but formed independently and provided with an adhesive film or an adhesive tape in contact with the bonding layer and the exposed adhesive film is protected by a release liner. Before use, the release liner is removed and the coating is applied to the substrate in a way that the adhesive film forms an intermediate layer between the substrate and the anisotropic polymeric coating. The adhesive film can be epoxy based providing high adhesive strength and preferably cures at or near room temperature. Other options include rubber-, silicone- or acrylic-based adhesive tapes which can also be pressure sensitive adhesives. In one preferred embodiment the adhesive layer replaces the bonding layer and is applied directly onto the icephobic layer. Such an approach can be used to apply the icephobic coating conveniently onto any part to render it icephobic, it is particularly suitable for use in repair and overhaul, e.g., where there is a requirement to patch eroded or deteriorated sections of the coating.

The present invention is based on the discovery that, in the case of applying an icephobic organic coating to a metallic or polymeric substrate surface, an isotropic coating does not readily achieve the desired overall performance as either adhesion to the underlying substrate or icephobic properties or both are unduly compromised which can have a significant effect on performance and durability. Monolithic coatings optimized for icephobicity were found to have rather poor adhesion to the substrate materials of interest and perform poorly on extended durability tests such as sand or rain erosion frequently resulting in part or the entire coating flaking off the underlying substrate surface resulting in premature failure.

Typically, the polymeric coating according to this invention uses the same ingredients throughout, e.g., the same curable epoxy or polyurethane resin, the same curing agent formulation etc. termed "basic coating formulation". The main difference in the chemical formulations near the "bonding surface" when compared to near the "icephobic surface" is, that, in the case of the "near bonding layer surface" the coating comprises merely the "basic coating formulation" with the optional addition of adhesion promoters, and elastomers. In contrast, "near the outer icephobic surface" the coating comprises the "basic coating formulation" with the addition of between 1 and 20 wt % of an "icephobic additive" with the optional addition of other additives, including, but not limited to, abrasive materials to enhance the hardness and erosion resistance of outer and near-outer surface and pigments to achieve any desired color. Consequently, the chemical composition throughout the polymeric coating is similar assuring excellent adhesion of sublayers, if any, to each other and excellent overall cohesive strength of the entire coating. This approach is far superior to, e.g., applying a distinct polymer primer to the substrate followed by the deposition of a distinct and unrelated, icephobic polymeric coating, which can lead to delamination of the "unrelated" polymer layers during use.

Accordingly, the polymeric coating applied to the metallic or polymeric material substrate is anisotropic and comprises, on the surface in contact with the substrate material, a "bonding layer" comprising a curable resin preferably free of silicones and, on the exposed outer surface an "icephobic layer" which, in addition to the same curable resin, contains at least 1 and up to 25 weight percent of a modified silicone.

Both, the bonding layer and the outer icephobic layer have a thickness of at least 5 microns, preferably at least 25 microns and more preferably at least 50 microns.

The bonding layer is deposited directly onto the substrate material and subsequently typically at least partially cured and another cure is performed after the icephobic top coat is applied. Depending on the number of sublayers the total number of curing steps involved is at least 2 but as many as 10+ curing cycles can be used, depending on the number of sublayers applied and the final properties desired.

In another aspect the invention provides a process for coating an article, said process comprising the steps of:
  providing an article of manufacture having an outer surface, or a predetermined portion thereof, comprised of a metallic or polymeric substrate material;
  coating the outer surface of the substrate material, or a predetermined portion thereof, with a curable polymeric resin of a first composition;
  substantially partially or fully curing the curable polymeric resin of the first composition to form a bonding layer;

coating the outer surface of the bonding layer with a polymeric resin of a second composition comprising an icephobic additive;

substantially fully curing the curable polymeric resin of the second composition to form a durable icephobic exposed outer surface;

In another aspect the invention provides a process for applying a prepreg coating to an article, said process comprising the steps of:

providing an article of manufacture having an outer surface, or a predetermined portion thereof, comprised of a metallic or polymeric substrate material;

independently forming and substantially partially or fully curing a curable polymeric resin of the second composition comprising an icephobic additive to form a durable icephobic exposed outer surface;

optionally applying onto the second composition layer a curable polymeric resin of a first composition and optionally partially or fully curing the curable polymeric resin of the first composition;

applying onto the first composition layer, if present, an adhesive layer and optionally partially or fully curing the multilayer construct;

optionally applying onto the adhesive layer a release liner;

upon use removing the optional release liner from the multilayer construct and applying it to the metallic or polymeric substrate material so that the icephobic layer of the second composition becomes the exposed outer surface.

Such processes result in achieving a very strong bond between the outer exposed coating surface and the underlying core substrate and the processes can be used to manufacture articles in which strong adhesion between the exposed polymeric coating and the underlying substrate is desired or necessary. In addition, the organic coating sublayers are formulated and/or processed to maximize cohesive strength within the polymeric coating sublayers themselves while achieving excellent adhesion between the sublayers as well. The processes are particularly suited for the manufacture of durable articles that require high water repellency, icephobicity, as well as abrasion resistance and flexural, tensile, torsional, impact and/or fatigue strength, such as required for sporting goods, automotive parts, aircraft components, building materials, industrials components exposed to the elements; and the like.

It is desirable to pretreat the substrate surface before it receives the polymer coating. The pretreatment can comprise mechanical abrasion and/or etching. Etching can be, e.g., accomplished with permanganate or sulfochromic chemical etch, or with a plasma etch.

The compositions comprising the curable resin can, for example, be applied by spraying. For this purpose, the composition desirably uses a solvent in a sufficient amount to obtain the viscosity suitable for spraying. It has been found that preferred solvents have a boiling point of less than 150° C., preferably less than 100° C. The importance of the boiling point of the solvent is related to the need to have the film substantially fully cured. It is important that, after curing, the polymeric coating has substantially no dissolved solvents and does not contain any liquids.

When applied by spraying, both the bonding layer and the icephobic layer are generally applied at about 3 to 20 mg/cm$^2$, preferably from 5 to 15 mg/cm$^2$. Depending on the thickness desired, it may be advantageous to apply each composition in two or more sprayed layers, with a partial curing (for example 30 minutes at 140° C. or 90° C.) between applications.

After applying the bonding layer and prior to depositing the icephobic outer layer, the bonding layer can be partially or fully cured as well as suitably pretreated. This pretreatment can comprise mechanically roughening and/or etching. Suitable etching processes include chemical etching processes and/or plasma etching.

When applying the icephobic layer, the spraying process described for applying the bonding layer is essentially replicated. Alternative processes can be used as well including, but not limited to, painting, doctor blading and screen printing.

While building up the entire polymeric coating, various curing steps can be performed and repeated, alternatively partial curing steps can be employed or the curing step can be deferred until the entire coating has been deposited.

As the person skilled in the art of organic coatings would appreciate, the organic coating can be applied to the core substrate in an automated production line where, e.g., the substrate to be coated passes from one spray booth to the next with optional partial or total curing and/or surface treatments in between. A multilayer laminate coating can be produced, e.g., changing the composition of the "paint" in each spray station to achieve a "stepwise" transition from the bonding layer composition to the icephobic surface composition. While the organic coating of this invention relies on at least two distinct layers, a multitude of layers, such as 5, or 10 or even more transitional layers can be incorporated between the inner surface (in contact with the substrate) and the outer (exposed) surface of the organic coating. Similarly, rather than having a multilayer laminate with distinct chemical compositions, a gradual change in the composition can be affected in the coating deposition direction and combinations of layered and graded layers are within the scope of this invention as well.

It is also possible to provide the icephobic polymer layer in freestanding form or supported such as a "pre-preg" as described above. The bonding layer film or pre-preg used in this process can be fabricated from the liquid epoxy formulation using standard industry practices used for fabricating thin film polymeric adhesive films and pre-pregs from solvent bearing formulations. The release liner protecting the adhesive film/transfer tape is removed before use and the anisotropic polymeric coating comprising an icephobic layer, a bonding layer and an additional adhesive layer or, alternatively, the adhesive layer is replacing the bonding layer altogether, is then applied to the substrate. For instance, the icephobic layer can be applied, e.g., sprayed onto the exposed surface of an adhesive tape which may have a release liner on the opposite side.

Articles or coatings made according to the process of this invention find use in a variety of applications requiring improved durability while retaining enhanced hydrophobic and icephobic properties.

EXAMPLES

The following is a description of Working Examples illustrating the benefits of the present disclosure, specifically the formulation of various polymeric coatings and methods of applying and curing the coatings as well as selected properties including the icephobic properties (Working Example I and III) as well as adhesion properties using a variety of substrates (Working Example II and IV).

Example I: Epoxy (EP) Coating Formulations, Application and Selected Properties

Various coating formulations were investigated as follows: Nusil™, a commercial product (two-part silicone elastomer dispersed in xylene) available from NuSil™ Technology LLC, Carpinteria, Calif. 93013, USA, which is widely recognized for its icephobic properties as indicated above, was applied to selected substrates by doctor blade whereas the various inventive epoxy-based coatings were applied to the substrates by spraying using a gravity feed type, HVLP (high volume-low pressure) epoxy spray gun operated at 60 psi. In-house paint formulations are provided in Table 2 below. The coated substrates were subsequently cured in a furnace at 140° C. for 2 hours, except for Nusil™, which was cured according to the manufacturer's specifications using four temperatures and durations as follows: RT/30 min, 75° C./45 min, and 150° C./135 min. Total target loading for each sample was 8-12 mg/cm$^2$ (thickness: 75-100 microns). If multiple layers were applied, e.g., an icephobic layer on top of the bonding layer, the thickness and loading for each layer was reduced to maintain the overall coating thickness/loading target and a curing step was performed after each layer. After curing, the exposed surface of all samples was smooth and had a surface roughness R$_a$<1 μm.

Cured coating samples produced were characterized as indicated in Table 3. For ease of comparison, the data of the various tests depicted in Table 3 are also shown in FIG. 1, namely the wetting angle, the ice adhesion according to the test described by the U.S. Army Engineer Research and Development Center, Hanover, N.H., USA, in the ERDC/CRREL Technical Note 03-4 (October 2003), the sand erosion value at impingement angles of 90° and 30° according to ASTM G76, and the Shore D hardness.

TABLE 2

In-house Epoxy (EP) Paint Formulations Investigated.

|  | Epoxy Resin Bonding Layer Formulation [g] | Icephobic Epoxy Resin Top Layer Formulation [g] |
|---|---|---|
| Epoxy Resin (EEW = 550) | 100 | 100 |
| Elastomer | 60 | 0 |
| Curing Agent | 5 | 5 |
| Adhesion Promoter | 8 | 0 |
| Additives | 15 | 0 |
| Icephobic Additive: Epoxide Functional Silicone Pre-Polymer | 0 | 7.5 |
| Silicone Oil | 0 | 0 |
| Solvent | 240 | 120 |

The results indicate that all coating surfaces are hydrophobic, that an icephobic additive such as a silicone is required to achieve a low icephobicity value on the first cycle (Nusil™ and silicone top layer containing coatings) and that, after repeated icing/deicing cycles seven times, the ice adhesion of the samples containing the solid silicone remain largely unchanged (modified silicone top layer containing coatings).

The data also reveal that the sand erosion values at 90° impingement with icephobic additions increase compared to the additive free formulation of the bonding layer, however, the erosion values at an impingement angle of 30° experience similar mass losses for all samples. In addition, the Shore D hardness values of the coatings containing epoxy resins are significantly higher than the one for Nusil™.

TABLE 3

Selected Coating Properties

|  |  | Single/Homogenous Layer | | Two-Layers Elastomer-Free |
|---|---|---|---|---|
|  | Nusil™ | 6.7% Silicone Containing Epoxy Layer (Icephobic Layer) | Silicone Free Epoxy Layer (Bonding Layer) | Bonding Layer plus Outer Exposed Surface Icephobic Layer |
| Exposed Surface Roughness, R$_a$ [μm] | <1 | <1 | <1 | <1 |
| Wetting Angle [°] | 119 | 123 | 115 | 123 |
| Cycle 1: Ice Adhesion [kPa] | 150 | 110 | 472 | 110 |
| Cycle 7: Ice Adhesion [kPa] | 305 | 110 | 691 | 110 |
| Sand Erosion Rate @ 90° [mm$^3$/kg] | 4.1 | 4.9 | 1.9 | 4.9 |
| Sand Erosion Rate @ 30° [mm$^3$/kg] | 2.1 | 1.8 | 1.9 | 1.8 |
| Shore Hardness | 40 (scale A) 0 (scale D) | 70-75 (scale D) | 70-75 (scale D) | 70-75 (scale D) |

Example II: Article Characterization

A number of substrates were selected (4×4 inch panels) for this investigation, namely Al, Ti, stainless steel, carbon fiber reinforced composite and Nylon. The smooth substrates (R$_a$<1 μm) were mechanically abraded with ultra-fine (500 grit) sand paper to a uniform finish, then cleaned and degreased by wiping with a suitable solvent and various coatings described in EXAMPLE I were applied as follows: (i) Nusil™, (ii) an epoxy based, silicone-free, bonding layer, (iii) an epoxy based icephobic layer and (iv) a two layer coating comprising the epoxy based bonding layer on the substrate followed by the epoxy based icephobic outer exposed layer.

TABLE 4

Adhesion Property Evaluation

|  |  | Single/Homogenous Layer | | 2-Layers |
|---|---|---|---|---|
|  | Nusil™ | 6.7% Silicone Containing Epoxy Layer (Icephobic Layer) | Silicone Free Epoxy Layer (Bonding Layer) | Elastomer-Free Bonding Layer plus Outer Exposed Surface Icephobic Layer |
| Pull Off Adhesion Strength from Titanium [psi] | 228 | 750 | 1322 | 1239 |
| Pull Off Adhesion Strength from Aluminum [psi] | 213 | 691 | 1344 | 1337 |
| Pull Off Adhesion Strength from Stainless Steel Grade 304 [psi] | 201 | 471 | 1411 | 1420 |
| Pull Off Adhesion Strength from Carbon Fiber Composite [psi] | 210 | 872 | 1846 | 1887 |
| Pull Off Adhesion Strength from Nylon [psi] | 247 | 428 | 942 | 945 |

Figure 2:
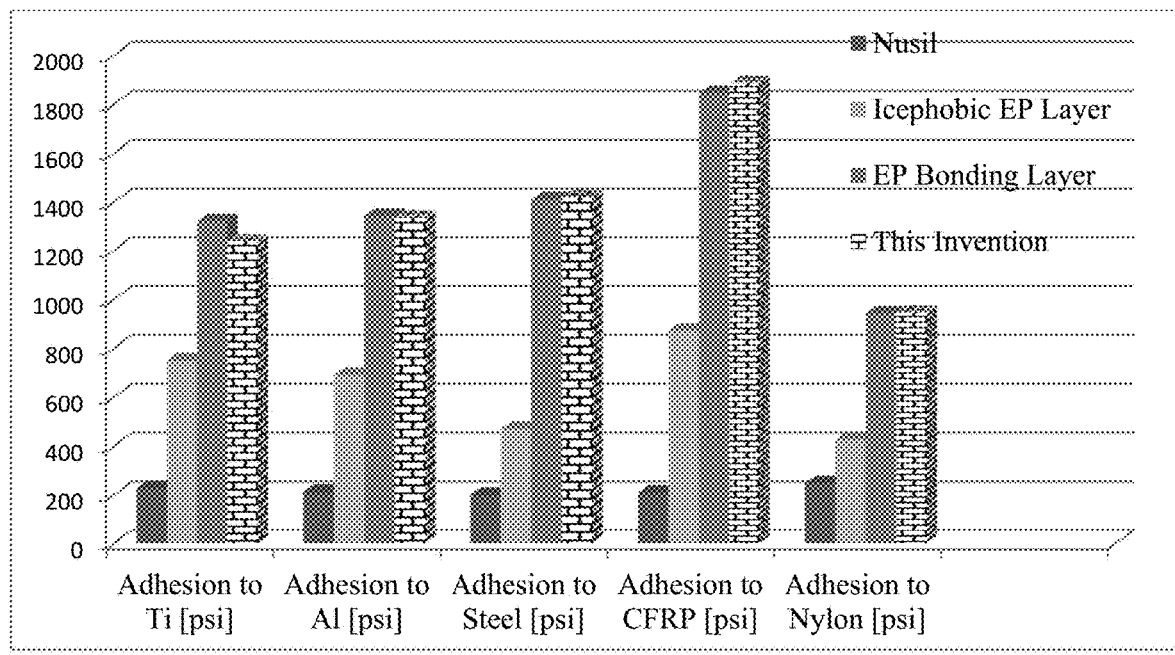
FIGS. 2 and 4 are graphs showing the pull-off adhesion strength of selected polymeric coatings applied to various substrates.

The adhesion between the top/exposed surface of any coating and the base substrate was measured by the "pull-off strength" according to standard ASTM 4541D. For ease of comparison, the data of the various samples are depicted in Table 4 are also shown in FIG. 2. The data reveal that layers with the icephobic additive (Nusil™ and icephobic layer) applied directly to the varies substrates have the lowest bond strength, whereas the icephobic additive-free bonding layer and the two-layer structure comprising a bonding layer in direct contact with the substrate and an outer, exposed icephobic layer results in an overall pull-off strength, at times, that exceeded 800 psi as well as 1,000 psi. Articles containing the Nusil™ coating, in all instances, delaminated at the interface of the substrate and the coating. Articles containing a bonding layer in contact with the various substrates, in all instances, showed both signs of delamination as well as cohesive failure, revealing the impressive strength of these samples.

These results indicate that an anisotropic coating (bonding layer+icephobic layer) provides a superior article with excellent durability, bond strength and long lasting icephobic properties.

Example III: Polyurethane (PU) Coating Formulations, Application and Selected Properties A thermoset polyurethane formulation which cures at room temperature with and without the addition of a modified silicone were applied to various substrates by spraying using a gravity feed type, HVLP (high volume-low pressure) spray gun operated at 60 psi and compared to the Nusil™ commercial product described above. In-house paint formulations are provided in Table 5 below. Total target loading for each sample was 8-12 mg/cm² (thickness: 75-100 microns). After curing, the exposed surface of all samples was smooth and had a surface roughness $R_a$<1 μm.

Figure 3:
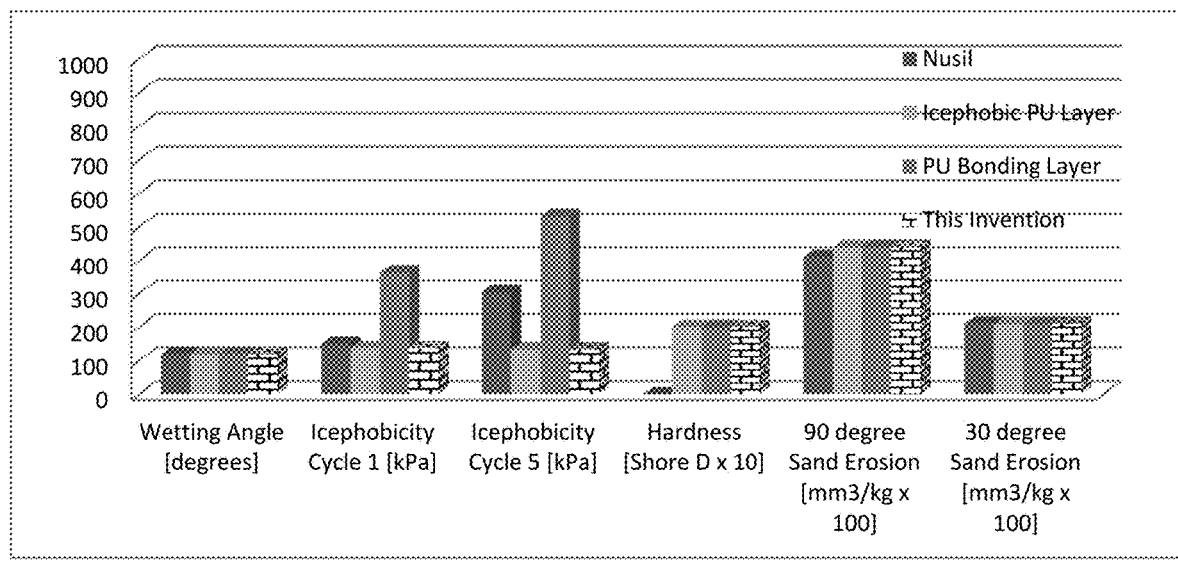

Cured coating samples produced were characterized as indicated in Table 6. For ease of comparison, the data of the various tests depicted in Table 6 are also shown in FIG. 3, namely the wetting angle, the ice adhesion according to the test described by the U.S. Army Engineer Research and Development Center, Hanover, N.H., USA, in the ERDC/CRREL Technical Note 03-4 (October 2003), the sand erosion value at impingement angles of 90° and 30° according to ASTM G76, and the Shore D hardness.

TABLE 5

In-house Polyurethane (PU) Paint Formulations Investigated.

| | PU Bonding Layer Formulation [g] | Icephobic PU Resin Layer Formulation [g] |
|---|---|---|
| Thermoset Polyurethane | 100 | 100 |
| Elastomer | 0 | 0 |
| Curing Agent | 100 | 100 |
| Adhesion Promoter | 0 | 0 |
| Additives | 0 | 0 |
| Icephobic Additive: Epoxide Functional Silicone Pre-Polymer | 0 | 10 |
| Silicone Oil | 0 | 0 |
| Solvent | 200 | 200 |

TABLE 6

Selected Coating Properties

| | Single/Homogenous Layer | | | Two-Layers |
|---|---|---|---|---|
| | Nusil ™ | 4.8% Silicone Containing PU Layer (Icephobic Layer) | Silicone Free PU Layer (Bonding Layer) | PU Bonding Layer plus Outer Exposed Surface Icephobic PU Layer |
| Exposed Surface Roughness, $R_a$ [μm] | <1 | <1 | <1 | <1 |
| Wetting Angle [°] | 119 | 120 | 120 | 120 |
| Cycle 1: Ice Adhesion [kPa] | 150 | 137 | 363 | 137 |
| Cycle 5: Ice Adhesion [kPa] | 305 | 133 | 532 | 133 |
| Sand Erosion Rate @ 90° [mm³/kg] | 4.1 | 4.4 | 4.4 | 4.4 |
| Sand Erosion Rate @ 45° [mm³/kg] | 3.5 | 3.5 | 3.5 | 3.5 |
| Sand Erosion Rate @ 30° [mm³/kg] | 2.1 | 2.1 | 2.1 | 2.1 |
| Shore Hardness | 40 (scale A) 0 (scale D) | 20 (scale D) | 20 (scale D) | 20 (scale D) |

The results indicate that all coating surfaces are hydrophobic, that an icephobic additive such as a silicone is required to achieve a low icephobicity value on the first cycle (Nusil™ and silicone top layer containing coatings) and that, after repeated icing/deicing cycles five times, the ice adhesion of the samples containing the solid silicone remain largely unchanged (modified silicone top layer containing coatings).

The data also reveal that the sand erosion at all angles of impingement with are similar for all samples. In addition, the Shore D hardness values of the coatings containing PU resins are significantly higher than the one for Nusil™.

Example IV: Article Characterization

A number of substrates were selected (4×4 inch panels) for this investigation, namely Al, Ti, stainless steel, carbon fiber reinforced composite and Nylon. The smooth substrates ($R_a$<1 μm) were mechanically abraded with ultra-fine (500 grit) sand paper to a uniform finish, then cleaned and degreased by wiping with a suitable solvent and various coatings described in EXAMPLE III were applied as follows: (i) Nusil™, (ii) a thermoset polyurethane based, silicone-free, bonding layer, (iii) an thermoset polyurethane based icephobic layer and (iv) a two layer coating comprising the thermoset polyurethane based bonding layer on the substrate followed by the thermoset polyurethane based icephobic outer exposed layer.

Figure 4:
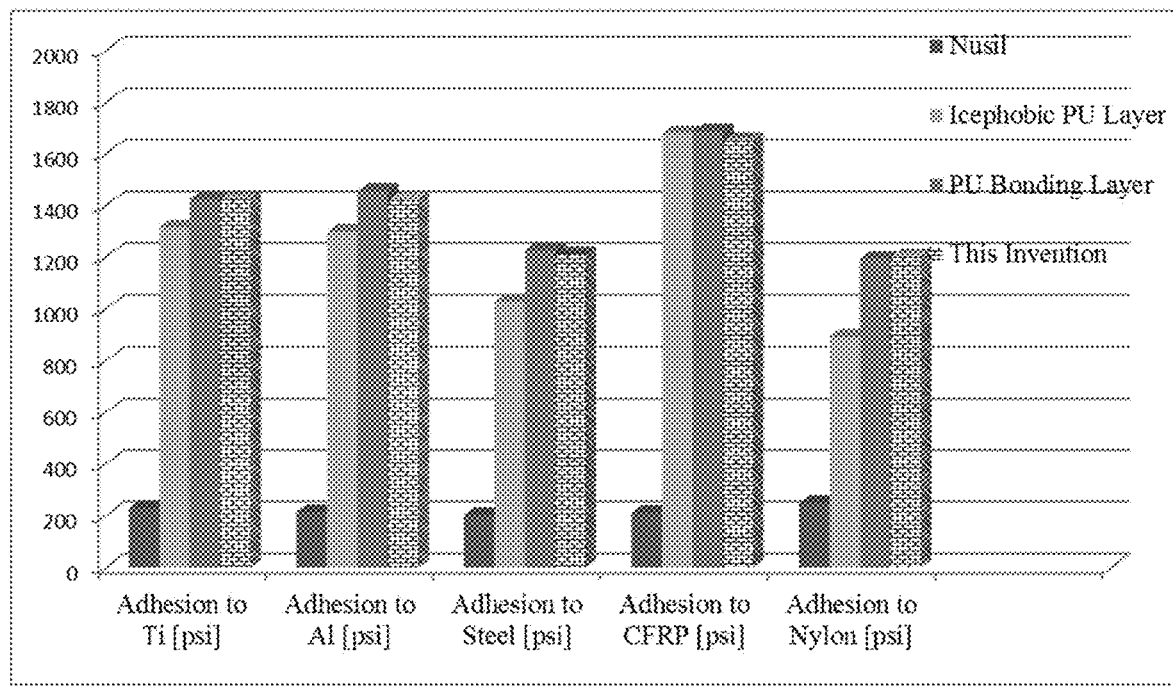

The adhesion between the top/exposed surface of any coating and the base substrate was measured by the "pull-off strength" according to standard ASTM 4541D. For ease of comparison, the data of the various samples are depicted in Table 7 are also shown in FIG. 4. The data reveal that layers with the icephobic additive (Nusil™ and icephobic layer) applied directly to the varies substrates have the lowest bond strength, whereas the icephobic additive-free bonding layer and the two-layer structure comprising a bonding layer in direct contact with the substrate and an outer, exposed icephobic layer results in an overall pull-off strength that exceeded 1,000 psi. Articles containing the Nusil™ coating, in all instances, delaminated at the interface of the substrate and the coating. Articles containing a bonding layer in contact with the various substrates, in all instances, showed both signs of delamination as well as cohesive failure, revealing the impressive strength of these samples.

These results indicate that an anisotropic coating (bonding layer+icephobic layer) provides a superior article with excellent durability, bond strength and long lasting icephobic properties.

TABLE 7

Adhesion Property Evaluation

|  | Single/Homogenous Layer | | 2-Layers |
| --- | --- | --- | --- |
|  | Nusil ™ | 4.8% Silicone Containing PU Layer (Icephobic Layer) | Silicone Free PU Layer (Bonding Layer) | PU Bonding Layer plus Outer Exposed Surface Icephobic PU Layer |
| Pull Off Adhesion Strength from Titanium [psi] | 228 | 1315 | 1423 | 1425 |
| Pull Off Adhesion Strength from Aluminum [psi] | 213 | 1298 | 1455 | 1420 |
| Pull Off Adhesion Strength from Stainless Steel Grade 304 [psi] | 201 | 1024 | 1224 | 1210 |
| Pull Off Adhesion Strength from Carbon Fiber Composite [psi] | 210 | 1677 | 1685 | 1650 |
| Pull Off Adhesion Strength from Nylon [psi] | 247 | 892 | 1192 | 1200 |

VARIATIONS

The foregoing description of the invention has been presented describing certain operable and preferred embodiments. It is not intended that the invention should be so limited since variations and modifications thereof will be obvious to those skilled in the art, all of which are within the spirit and scope of the invention.

The invention claimed is:

1. A cured polymeric coating which is compositionally graded or layered to be anisotropic in the deposition direction, the cured polymeric coating comprising:
    a cured first chemical composition extending at least 2.5 microns in height from an outer surface of an underlying substrate;
    (ii) a cured second chemical composition having a different chemical composition than the cured first chemical composition, the cured second chemical composition comprising a polymeric resin and an icephobic material addition forming an exposed outer surface extending at least 2.5 microns in depth from the exposed outer surface, wherein the cured second chemical composition:
    a) contains the icephobic material addition representing up to 25% by weight of the cured second chemical composition;
    b) has a sand erosion value according to standard ASTM G76 at an impingement angle of 90 degrees of less than 10 mm$^3$/kg; and
    c) has an ice adhesion value of less than 300 kPa as prepared when measured according to ERDC/CRREL Technical Note 03-4; and
    said cured polymeric coating has a total thickness of at least 10 microns, and the pull-off strength between the underlying substrate and the exposed outer surface of the cured polymeric coating, according to standard ASTM 4541D, is at least 250 psi.

2. The cured polymeric coating according to claim 1, wherein the cured polymeric coating exhibits no failure after being exposed to at least one temperature cycle according to ASTM B553-71 service condition 1.

3. The cured polymeric coating according to claim 1, wherein the cured polymeric coating at room temperature is free of liquids.

4. The cured polymeric coating according to claim 1, wherein the pull-off strength between the underlying substrate and the exposed outer surface of the cured polymeric coating, according to standard ASTM 4541D, is at least 300 psi.

5. The cured polymeric coating according to claim 1, wherein both the cured first chemical composition and the cured second chemical composition, prior to curing, comprise one or more curable epoxy resins with an EEW number of between 100 and 750.

6. The cured polymeric coating according to claim 1, wherein the cured first chemical composition forms the inner surface contacting the underlying substrate, and said inner surface is rough with a surface roughness of $R_a$>1 micron; and
    the cured second chemical composition forms the exposed outer surface exposed to atmosphere; and said exposed outer surface is smooth with a surface roughness $R_a$<1 micron.

7. The cured polymeric coating according to claim 1, wherein the cured second chemical composition has an ice adhesion value of less than 500 kPa after 5 icing/deicing cycles when measured according to ERDC/CRREL Technical Note 03-4.

8. The cured polymeric coating according to claim 1, wherein the cured second chemical composition has a contact angle for water at room temperature greater than 90°.

9. The cured polymeric coating according to claim 1, wherein the icephobic material addition of the cured second chemical composition is composed entirely of solids.

10. The cured polymeric coating according to claim 1, wherein the icephobic material addition of the cured second chemical composition comprises a polysiloxane.

11. The cured polymeric coating according to claim 10, wherein the polysiloxane of the cured second chemical composition comprises an epoxy modified silicone.

12. The cured polymeric coating according to claim 1, wherein the cured second chemical composition has a Shore D-Scale Hardness of at least 20.

13. A non-isotropic article comprising:
    a substrate at least partly covered by a layered and/or graded polymeric coating having a total thickness of at least 2.5 microns applied to at least a part of an outer surface of the substrate and forming an exposed outer surface of the article, wherein the polymeric coating, after curing:
    (i) contains an icephobic material addition representing up to 25% by weight of the cured polymeric coating;
    (ii) has a contact angle for water at room temperature greater than 90 degrees; and
    (iii) has an ice adhesion of less than 500 kPa as prepared and after 5 icing/deicing cycles when measured according to ERDC/CRREL Technical Note 03-4;
    wherein said non-isotropic article has a pull-off strength between the substrate and an exposed outer surface of the cured polymeric coating, according to standard ASTM 4541D, of at least 250 psi.

14. The non-isotropic article according to claim 13, wherein the substrate is formed of a metallic material or a polymeric material.

15. The non-isotropic article according to claim 13, wherein the cured polymeric coating has a Shore D-Scale Hardness of at least 20.

16. The non-isotropic article according to claim 13, wherein the icephobic material addition, in its cured form, is composed entirely of solids.

17. The non-isotropic article according to claim 13, wherein the non-isotropic article exhibits no failure after being exposed to at least one temperature cycle according to ASTM B553-71 service condition 1.

18. The non-isotropic article according to claim 13, wherein the cured polymeric coating has a cured first chemical composition and a cured second chemical composition having a different chemical composition than the cured first chemical composition,
   wherein the cured first chemical composition forms the inner surface contacting the substrate, said inner surface is rough with a surface roughness of $R_a > 1$ micron, and
   wherein the cured second chemical composition forms the exposed outer surface exposed to atmosphere, said exposed outer surface is smooth with a surface roughness $R_a < 1$ micron.

19. A non-isotropic article comprising:
   (i) a substrate; and
   (ii) a polymeric coating compositionally graded or layered to be anisotropic in a deposition direction, having a total thickness of at least 10 microns, applied to at least part of an outer surface of the substrate, and having an inner surface in intimate, direct contact with the substrate, and comprising:
      (a) a cured first chemical composition comprising a polymeric resin at an interface between said polymeric coating and the substrate extending at least 2.5 microns in height from the outer surface of the substrate;
      (b) a cured second chemical composition having a different chemical composition than the cured first chemical composition, comprising a polymeric resin and an icephobic material addition forming an exposed outer surface of said non-isotropic article extending at least 2.5 microns in depth from the exposed outer surface, wherein the cured second chemical composition:
         (i.b) contains the icephobic material addition composed entirely of solids;
         (ii.b) has a Shore D-Scale Hardness of at least 20;
         (iii.b) has a sand erosion value according to standard ASTM G76 at an impingement angle of 90 degrees of less than 10 mm$^3$/kg;
         (iv.b) is hydrophobic; and
         (v.b) has an ice adhesion of less than 300 kPa as prepared and of less than 500 kPa after 5 icing/deicing cycles when measured according to ERDC/CRREL Technical Note 03-4.

20. The non-isotropic article according to claim 19, wherein the icephobic material addition represents up to 25% by weight of the cured second chemical composition.

21. The non-isotropic article according to claim 20, wherein said icephobic material addition comprises a polysiloxane.

22. The non-isotropic article according to claim 21, wherein said polysiloxane comprises an epoxy modified silicone.

23. The non-isotropic article according to claim 19, wherein said polymeric coating in both the cured first chemical composition and the cured second chemical composition, prior to curing, comprises one or more curable epoxy resins with an EEW number of between 100 and 750.

24. The non-isotropic article according to claim 19, wherein the pull-off strength between the substrate and the exposed outer surface of the polymeric coating, according to standard ASTM 4541 D, is at least 250 psi.

25. The non-isotropic article according to claim 19, wherein said exposed outer surface is smooth with a surface roughness $R_a \leq 1$ micron, and
   wherein the cured first chemical composition forms the inner surface, said inner surface is rough with a surface roughness of $R_a > 1$ micron.

26. The non-isotropic article according to claim 19, wherein said substrate is a metallic material or a polymeric material.

* * * * *